D. A. BIEBINGER.
FERTILIZER DISTRIBUTER FOR PLANTERS.
APPLICATION FILED MAY 23, 1910.
1,057,920.
Patented Apr. 1, 1913.
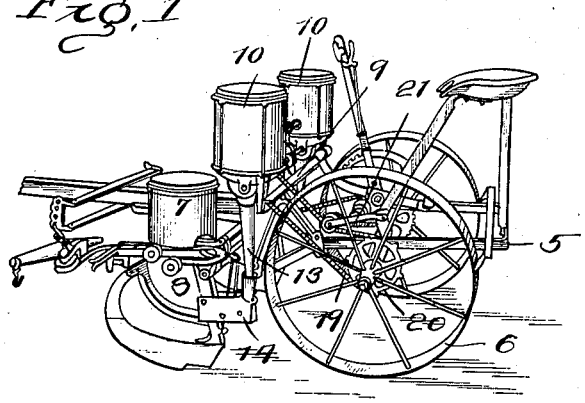
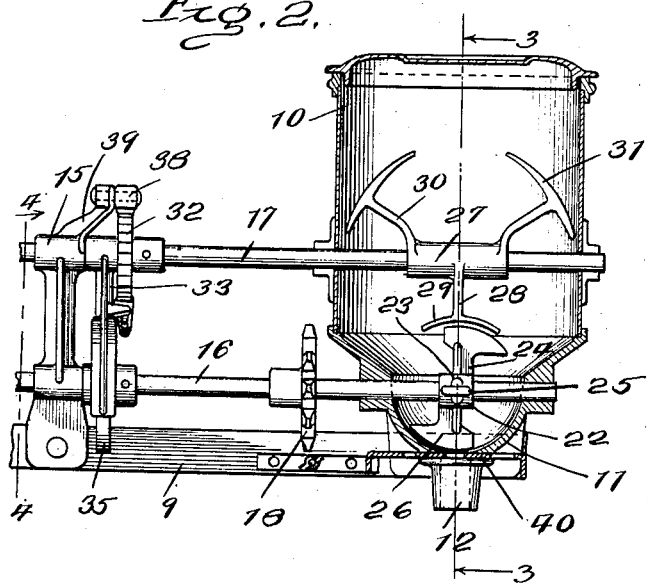
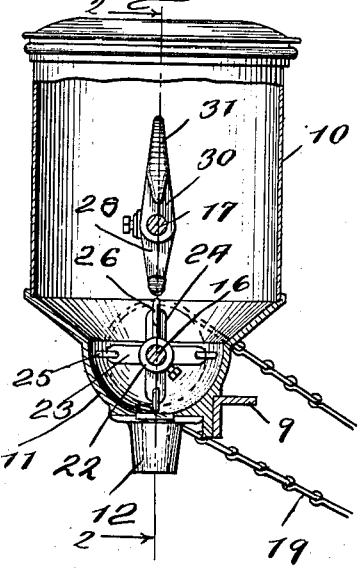
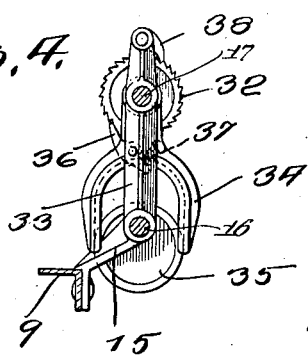
Witnesses
Inventor
David A. Biebinger
By H. S. Bliss
Attorney

UNITED STATES PATENT OFFICE.

DAVID A. BIEBINGER, OF LA CROSSE, WISCONSIN, ASSIGNOR TO AVERY COMPANY, A CORPORATION OF ILLINOIS.

FERTILIZER-DISTRIBUTER FOR PLANTERS.

1,057,920. Specification of Letters Patent. Patented Apr. 1, 1913.

Application filed May 23, 1910. Serial No. 562,879.

*To all whom it may concern:*

Be it known that I, DAVID A. BIEBINGER, a citizen of the United States, residing at La Crosse, in the county of La Crosse and State of Wisconsin, have invented certain new and useful Improvements in Fertilizer-Distributers for Planters, of which the following is a specification, reference being had therein to the accompanying drawing.
The present invention relates more particularly to fertilizer distributing mechanism employed in connection with planting apparatus, and the primary object is to provide novel mechanism of a simple and effective character that can be employed with any well known type of planter, and can be readily mounted directly on the same.

One embodiment of the invention is disclosed in the accompanying drawings, wherein:—

Figure 1 is a perspective view of a planter, showing the fertilizer distributing mechanism in place. Fig. 2 is a longitudinal sectional view on an enlarged scale, through one of the magazines or fertilizer holders, showing the agitating mechanism. The view is taken along the line 2—2 of Fig. 3. Fig. 3 is a sectional view taken along the line 3—3 of Fig. 2. Fig. 4 is a detail sectional view on the line 4—4 of Fig. 2.

Similar reference numerals designate corresponding parts in all the figures of the drawings.
In the embodiment disclosed, a planter of a well known type is illustrated and needs no particular description. Suffice it to state that it consists generally of a frame 5 mounted on supporting wheels 6 that also constitute drivers, said frame having secured thereto the usual seed boxes 7 and planting mechanism 8.

A cross bar 9, preferably of angle iron, is suitably mounted on the frame 5, in rear of the planting mechanism, and secured thereto are two magazines 10 for holding the fertilizer, said magazines having hopper bottoms 11 that are provided with delivery spouts 12. These spouts enter suitable conducting tubes 13 leading to boxes 14 that are secured to the planting mechanism and extend in rear of the same.

A bracket 15 is fixed upon the supporting bar 9, and journaled in said bracket and in the magazines 10 are two shafts, designated respectively 16 and 17. The lower shaft 16 has fixed thereto, a sprocket wheel 18, around which passes a sprocket chain 19 that also passes around a sprocket wheel 20 carried by the axle of the planter. It will thus be evident that when the planter is in motion, the shaft 16 will be revolved. A suitable tightener 21 is preferably employed for the sprocket chain 19. Mounted on the end portions of the shaft 16, within the hopper bottoms of the magazines are hubs 22 carrying radially disposed arms 23 and 24. The arms 23 have short transverse terminal stirring blades 25, while the arms 24 are provided with longer transverse terminal blades 26 that are oppositely disposed and extend in opposite directions longitudinally of the shaft 16. These blades 26 have convexed outer edges, and each furthermore has at one end a straight edge and terminates at the other end in a point.

Secured to the end portions of the shaft 17, within the magazines, are hubs 27, each of which is provided with a central radially disposed arm 28 terminating in a concaved blade 29 that operates over the blades 26 in a non-intersecting path therewith. The hub 27 is furthermore provided with terminal divergently disposed arms 30, the free ends of which carry stirring blades 31 that are disposed at right angles to the arms 30 and are thus convergently arranged.

An intermittent movement is given to the shaft 17, and to this end, said shaft is provided with a ratchet wheel 32, disposed adjacent to the bracket 15. Fulcrumed on said shaft 17, between the ratchet wheel 32 and the bracket 15. is a lever 33, the free end of which is in the form of a yoke 34 that embraces an eccentric 35 mounted on the shaft 17. A dog 36, pivoted on the lever, operates upon the teeth of the ratchet wheel 32, and is held in coaction therewith by a spring 37. In order to prevent the retrograde rotation of the ratchet wheel 32, and consequently of the shaft 17, a dog 38 is pivoted upon an upstanding arm 39 of the bracket 15, and rests against the teeth of said ratchet wheel.

The operation of the mechanism is substantially as follows: When the planter is in operation, as already explained, the shaft 16 will be continuously rotated, and the agitator arms and blades carried thereby, will as a consequence, rotate in the lower portion of the magazines. The fertilizer will consequently be maintained in loosened condition, and delivered through the spouts 12 into and through the tubes 13. The amount delivered can be easily regulated by means of the slides 40, which extend across the bottoms of the magazines, in order that the delivery openings can be made as small as desired. As the shaft 16 rotates, the lever 33 will of course be oscillated, and the dog 36 operating on the ratchet wheel, will effect a step-by-step rotation of said ratchet wheel, and consequently of the shaft 17. This will effect a slow rotation of the arms 28 and 30 with their blades, and therefore the body of the fertilizer in the magazines will be kept loosened, and will gradually gravitate into the bottoms of said magazines, insuring a proper feeding of the material.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a fertilizer distributer, the combination with a magazine which is circular in horizontal cross section and which is provided with a bottom discharge opening, of a feeding device mounted above the discharge opening and provided with stirring arms having blades with their outer edges in the form of arcs struck about the axis of the magazine as a center.

2. In a fertilizer distributer, the combination of two fertilizer holding magazines each provided with a discharge opening, a transverse shaft extending into both magazines, two feeding devices on the shaft each located within one of the magazines adjacent the discharge opening, a second transverse shaft parallel to the first and extending into both magazines, stirring devices on the second shaft, one located within each magazine, means for continuously rotating the first shaft, and means for transmitting motion from the first shaft to the second to cause the latter to rotate intermittently at a relatively slow speed.

3. In a fertilizer distributer, the combination of a magazine, two parallel rotatable shafts in the magazine, an agitating device on one shaft provided with radial arms all in the same plane, and a second agitating device on the other shaft having an arm in the same plane with the arms on the first agitating device, the outer circles of rotation of the said arms of the two agitating devices being approximately tangent, the said second agitating device also having other arms in planes parallel to the said plane and at each side thereof, the last said arms extending radially outward farther than the first said arm of the second agitating device.

4. In a fertilizer distributer, the combination with a magazine, of a rotary agitating mechanism operating therein and comprising a shaft, a hub mounted on the shaft, a radial arm carried by the shaft and having a terminal agitating blade, and other divergent arms carried by the hub and having terminal blades that are convergently disposed.

5. In a fertilizer distributer, the combination with a magazine having a bottom delivery opening, of a lower shaft journaled in the magazine, radial arms carried by the shaft, transversely disposed blades formed on the ends of the arms and having convexed edges, an upper shaft journaled in the magazine, and an arm carried by said shaft and having a concaved terminal blade that operates over the first mentioned blades, said latter shaft also having divergently disposed arms and terminal blades carried by the ends thereof.

6. In a fertilizer distributer, the combination of two fertilizer holding magazines each provided with a discharge opening, a transverse shaft extending into both magazines, two feeding devices on the shaft each located within one of the magazines adjacent the discharge opening thereof, a second transverse shaft parallel to the first and extending into both magazines, stirring devices on the second shaft, one located in each magazine and arranged to coöperate with the corresponding feeding device, means for actuating one of the said shafts, and a connection between the two shafts whereby power can be transmitted from one of them to drive the other.

7. In a fertilizer distributer, the combination of two fertilizer holding magazines each provided with a discharge opening, a transverse shaft extending into both magazines, two feeding devices on the shaft each located within one of the magazines adjacent the discharge opening thereof, a second transverse shaft parallel to the first and extending into both magazines, stirring devices on the second shaft, one located in each magazine and arranged to coöperate with the corresponding feeding device, and power means for simultaneously driving the two shafts.

In testimony whereof I affix my signature, in presence of two witnesses.

DAVID A. BIEBINGER.

Witnesses:
   Mrs. D. BIEBINGER,
   L. J. KILIAN.